United States Patent
Smith

(10) Patent No.: US 8,424,925 B2
(45) Date of Patent: Apr. 23, 2013

(54) SPLIT FITTING FOR PIPE

(75) Inventor: Edward B. Smith, Berea, OH (US)

(73) Assignee: The Pipe Line Development Company, Westlake, OH (US)

( * ) Notice: Subject to any disclaimer, the term of this patent is extended or adjusted under 35 U.S.C. 154(b) by 13 days.

(21) Appl. No.: 13/152,434

(22) Filed: Jun. 3, 2011

(65) Prior Publication Data

US 2012/0306191 A1 Dec. 6, 2012

(51) Int. Cl.
*F16L 21/00* (2006.01)

(52) U.S. Cl.
USPC .................. 285/373; 285/15; 285/419

(58) Field of Classification Search ............ 285/15, 285/373, 372, 419, 367
See application file for complete search history.

(56) References Cited

U.S. PATENT DOCUMENTS

| | | | | |
|---|---|---|---|---|
| 666,659 | A * | 7/1867 | Weston | 285/373 |
| 1,913,030 | A | 6/1933 | Frank | |
| 3,017,204 | A * | 1/1962 | Smith | 285/373 |
| 3,078,108 | A * | 2/1963 | Smith | 285/373 |
| 3,243,153 | A | 3/1966 | Nigro | |
| 3,517,701 | A * | 6/1970 | Smith | 285/15 |
| 3,550,638 | A | 12/1970 | Smith | |
| 3,554,589 | A | 1/1971 | Boggs | |
| 3,643,986 | A * | 2/1972 | Allan | 285/419 |
| 3,885,818 | A * | 5/1975 | Ammann | 285/373 |
| 3,954,288 | A | 5/1976 | Smith | |
| 3,994,514 | A * | 11/1976 | Zimmerer et al. | 285/373 |
| 4,015,634 | A * | 4/1977 | Christie | 285/373 |
| 4,284,298 | A * | 8/1981 | Kaufmann, Jr. | 285/373 |
| 4,354,698 | A * | 10/1982 | Linder et al. | 285/373 |
| 4,422,793 | A | 12/1983 | Mandich | |
| 4,557,470 | A | 12/1985 | Link | |
| 4,580,788 | A | 4/1986 | Rabe et al. | |
| 4,768,813 | A * | 9/1988 | Timmons | 285/373 |
| 5,269,622 | A | 12/1993 | Mullenberg | |
| 5,368,336 | A | 11/1994 | Van Vleet et al. | |
| 5,370,472 | A | 12/1994 | Muellenberg | |
| 5,404,914 | A | 4/1995 | Ziu | |
| 5,480,193 | A | 1/1996 | Echols et al. | |
| 5,573,290 | A | 11/1996 | Smith | |
| 6,276,726 | B1 * | 8/2001 | Daspit | 285/15 |
| 6,406,210 | B1 | 6/2002 | Parrish et al. | |
| 6,824,471 | B2 | 11/2004 | Kamenov | |
| 7,198,465 | B1 * | 4/2007 | Ichiryu | 285/367 |
| 7,278,799 | B2 | 10/2007 | Grape | |
| 7,395,772 | B2 | 7/2008 | Slatter | |
| 2008/0145139 | A1 | 6/2008 | Atkins et al. | |

FOREIGN PATENT DOCUMENTS

| | | |
|---|---|---|
| DE | 202010010531 U | 12/2010 |
| FR | 763297 | 11/1933 |
| GB | 120667 | 7/1918 |
| GB | 2310903 A | 9/1997 |

* cited by examiner

*Primary Examiner* — David E Bochna
(74) *Attorney, Agent, or Firm* — Pearne & Gordon LLP

(57) ABSTRACT

A pipe repair fitting comprising a mating pair of generally semi-circular segments, each formed by an arcuate wall having arcuate ends, the segment walls carrying compressible seals for sealing two pairs of mating arcuate ends of the segments and sealing on the outer periphery of the pipe, at least one threaded hole in each arcuate wall end, a common bolt threaded into each of the threaded holes of each pair of mating arcuate ends and serving to sustain hoop forces in the fitting imposed by fluid leaking out of the pipe and contained by said seals.

5 Claims, 3 Drawing Sheets

SPLIT FITTING FOR PIPE

BACKGROUND OF THE INVENTION

The invention relates to pipeline repair fittings, particularly of the diametrally split sleeve or ring type.

PRIOR ART

Repair of a large pipeline, required because corrosion, collision, other impact, thermal and/or mechanical stress results in a leak, can be made by assembling a split sleeve or ring around the leaking area and then sealing the encircled zone. Conventional split repair fittings, particularly for large diameter pipelines, have often been fabricated from steel plate bent into an arcuate shape configured to fit concentrically over the pipe. Flanges or sidebars, typically cut from heavy steel plate stock, are welded along the axially extending edges of the arcuately bent plates so that the sidebars lie in generally radial directions and complete the arc of a segment comprising one-half of a split fitting. Ultimately, the sidebars of two opposed sleeve or ring segments are bolted together to encircle the pipe being repaired.

The traditional segment fabricating process is expensive for a variety of reasons. Because of its thickness, particularly for large pipe fittings, the stock used for making the sidebars is costly and is cut with oxygen acetylene rather than a laser. This cutting technique requires the heat affected area to be ground off and is imprecise so that some amount of "fitting" by grinding the parts to a complementary shape is involved when the parts are initially mated up with the arcuate plate for subsequent welding. At this stage, there can be at least three separate individuals involved in bending the plate into an arc, shaping the sidebars, and fitting the sidebars to the arcuate plate. Any one or more of these labor steps can introduce substantial variation in the initial fabrication of a half sleeve or segment. Because of the expected variations, enough extra stock must usually be provided, and then be machined away to provide a serviceable clearance fit on the outside diameter of the pipeline.

Once the sidebars are fitted to the edges of the arcuate plate, these parts are carefully welded together. Extra pieces of steel can be temporarily welded to these parts to get a full weld at the run off at their ends, and to hold them to their desired shapes until they eventually cool. The parts are then welded together, starting with a manual or service automatic root pass followed, ordinarily, by automatic machines making numerous passes as the parts are oriented and reoriented in multiple steps. Typically, the initial root pass is most prone to show imperfections upon inspection. Thereafter, the fabricated segment part is x-rayed, typically offsite of the fabrication site, to assure the integrity of the welds. Subsequently, the segment is heat treated to relieve the internal stresses developed in the welding process. The extra pieces used to enhance the run off ends of the welds and to hold the shape of the segment are cut off and ground flat. Regulations can impose the burden on the manufacturer of the repair fitting to record the source of the various steel parts, the welding procedure, the welder, and the date when the fitting component was produced. The foregoing is a brief outline of typical material, labor and time considerations involved in the fabrication of sleeve or ring segment weldments commonly used in the past.

The sidebars, when drawn tight with the associated bolts, apply a bending stress to the wall of the semi-circular shell. Consequently, the shell wall must be made thicker to withstand this stress. A thicker shell wall requires thicker sidebars. The sidebars add weight and girth to a fitting. Weight is reflected by added material costs, shipping and handling costs, as well as installation costs. The overall physical size of the fitting requires correspondingly large equipment for finish machining and can make it difficult or impossible to install at a particular site. Where, after installation, the fitting is coated with a protective material, the sidebars and bolts extending through the sidebars complicate the coating process. Further, bolts extending through the sidebars are difficult to seal weld, particularly when inverted and under water.

U.S. Pat. Nos. 3,017,204, 3,078,108, 3,152,816, and 3,467,141 illustrate examples of prior art split sleeves and flange repair fittings.

SUMMARY OF THE INVENTION

The invention provides an improved pipe repair fitting of the split sleeve or ring type. With the invention, conventional sidebars or flanges at the split plane are eliminated. The disclosed fitting of the invention is easier and less expensive to manufacture, weighs less, can be installed in confined spaces, and can be more easily seal welded than traditional types of split fittings.

As disclosed, segment halves of the fitting are each formed with cylindrical walls of generally uniform thickness. This simple structure permits their rough fabrication in a press brake without the need for attaching sidebars and all of the complications and expense attendant to a weldment. At each of their arcuate ends, the segment halves are machined with at least one precision formed internally threaded hole. The threaded holes of opposed arcuate ends of a pair of segment halves are precisely aligned. The threads are formed so that when the segments are properly registered with one another, the threads of one hole and the threads of an opposed hole lie on a common helix. The disclosed relationship of the threads allows a threaded bolt or stud holding the segments together to employ the walls of the segments on both sides of the split plane to function as the equivalent of a nut but without the need for such nuts and the additional space they would require.

Preferably one of the pair of aligned threaded holes is blind, while the opposing hole in the opposite segment is similarly closed, but for a reduced diameter hole that receives a tool for turning the bolt. Further, preferably one of the holes is deep enough to fully or substantially fully receive an associated bolt before the segments are mated together. Once the segments are in proper registration, the bolts can be extended from one threaded hole into the opposing threaded hole to thereby mechanically join the segments together. With the bolts initially received in the deep holes, they are protected in transit and are not susceptible to being dropped during installation, which is particularly important in underwater applications.

DESCRIPTION OF THE PREFERRED EMBODIMENT

Figure 1:
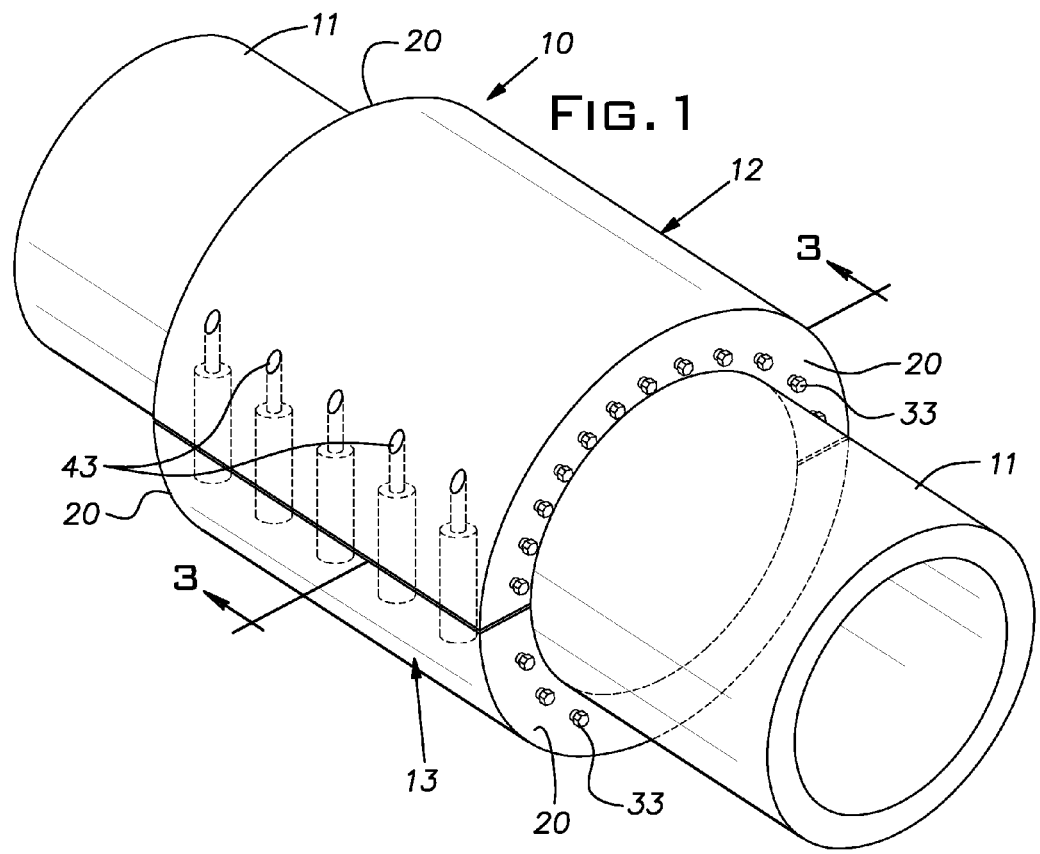
FIG. 1 is a perspective view of a pipe fitting constructed in accordance with the invention.
Figure 2:
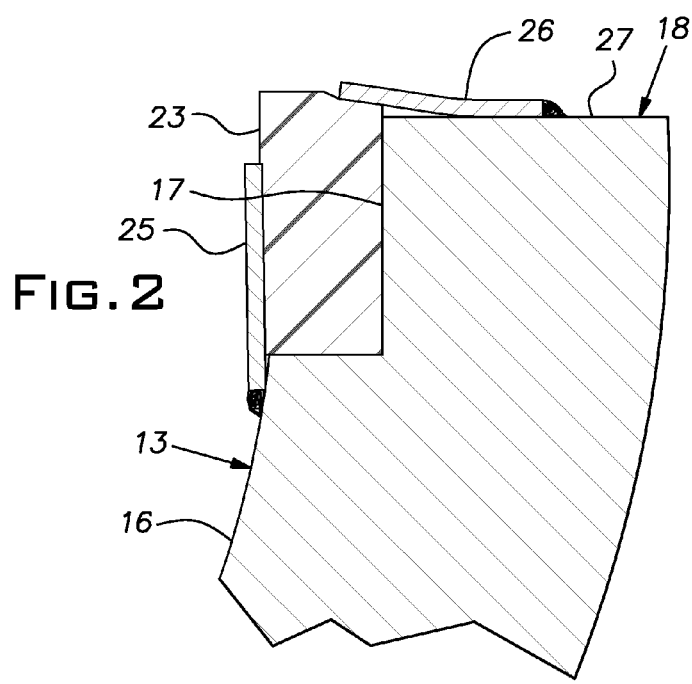
FIG. 2 is a fragmentary cross-sectional view of a portion of a wall of a fitting segment taken in the plane 2-2 in FIG. 4.
Figure 3:
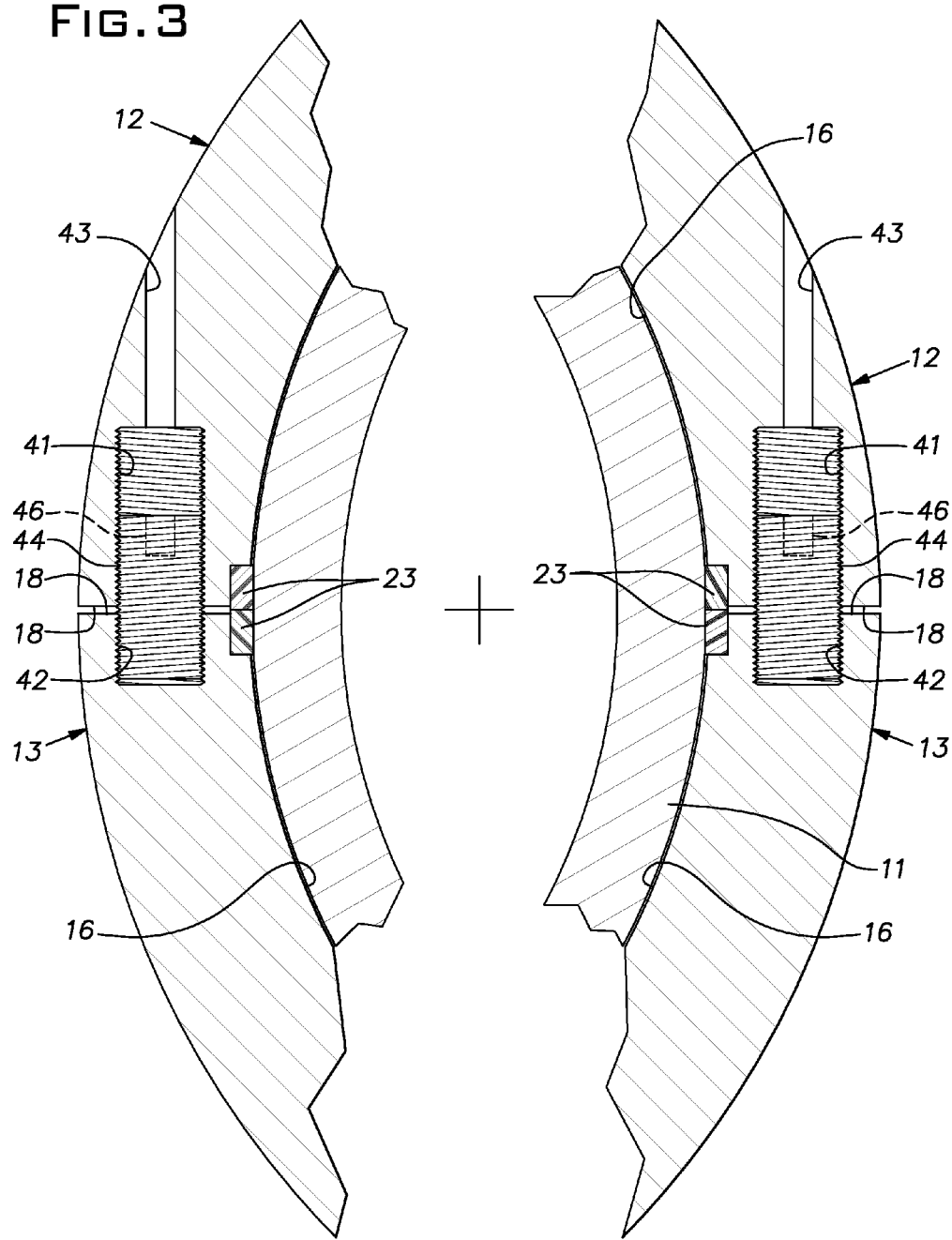
FIG. 3 is a fragmentary cross-sectional view of the fitting taken in a plane transverse to the pipeline indicated by the lines 3-3 in FIG. 1.

Referring now to the drawings, there is shown a repair fitting 10 assembled on a pipeline 11 in order to contain leakage from the pipeline due to damage caused by corrosion, accident or other reason. The fitting 10 comprises a hollow cylinder made in two mating half sections or segments 12, 13. The segments 12, 13 in their simplest form are generally uniform in their wall thickness.

While the segments or half rings 12, 13 can be fabricated from steel tubing, cast of steel, or otherwise made, they commonly will be fabricated from heavy steel plate, typically in a press brake, particularly when large pipe sizes are involved. For example, the segments 12, 13 can be rough formed in a press brake, or with heavy rolls, and then finish machined as required. Typically, the circumferential exterior of the segments 12, 13 can be left as fabricated without machining. The inside cylindrical surfaces 16 of the segments 12, 13 can be machined to assure a clearance fit around the pipeline 11. The interior of the segments 12, 13 is also machined with axial grooves 17 at their arcuate ends, designated 18 and with arcuate grooves 19 adjacent their axial ends, designated 20. The grooves 17, 19 receive elastomeric compressible seals 23, 24, respectively. Axially oriented seals 23 are retained by metal strips 25, 26 welded to the inside surface 16 and an arcuate end surface 27 that lies parallel to the diametral plane at which the segments 12, 13 abut. When the segments 12, 13 are finally assembled around the pipeline 11 to encircle it, the seals 23 stop fluid from the pipeline from leaking radially through the diametral plane at which they mate.

Figure 4:
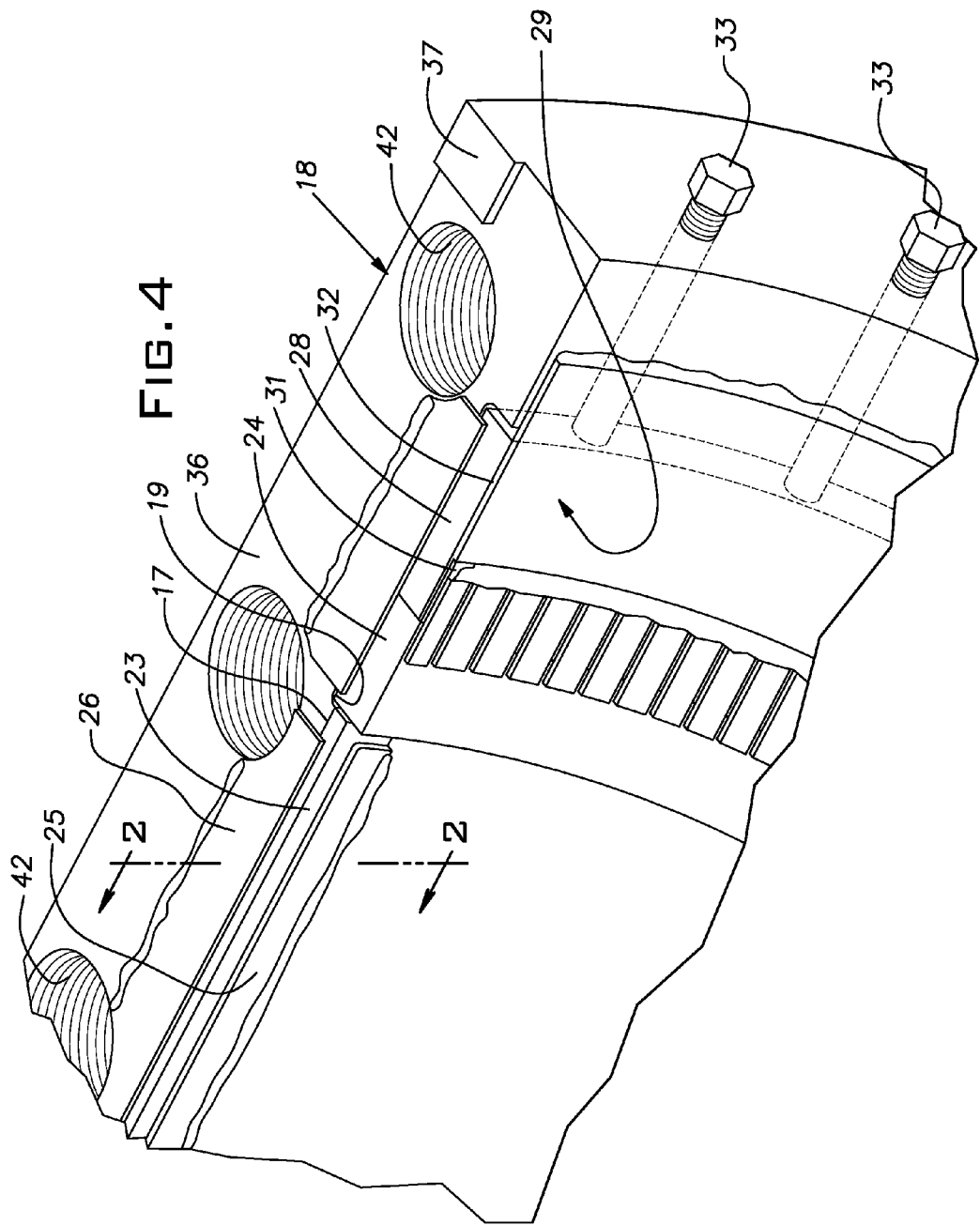
FIG. 4 is a fragmentary perspective view of the interior of an end portion of a segment of the fitting.

The arcuate groove 19 also receives a semi-circular thrust ring section 28 of steel or other suitable rigid material. The seal 24 and thrust ring segment 28 are retained, and in service restrained, by a sheet metal retainer 29 which can be an assembly of two strips 31, 32. One of the strips 31, is slotted or notched to assist it in conforming radially to the outside surface of the pipeline 11. A series of axially oriented thrust screws 33 operate in threaded holes spaced about the arcs of both end faces 27 at each end of each segment 12, 13. The thrust screws 33 at each axial end of each segment 12, 13, bear against end faces of respective thrust ring segments 28 (FIG. 4).

As previously indicated, the segments 12, 13 can be rough formed from steel plate in a press brake or roll set. The inside cylindrical surfaces 16 and arcuate end surfaces 27 are preferably machined to finish size and configuration. Arcuate end surfaces 27 can be machined with major surface areas 36 spaced slightly from and parallel to a true diametral plane. Precise locating pads 37 in the form of rectangular islands, can be machined on these arcuate ends at the true diametral plane of their respective segment 12, 13. Alternatively, the full surface of the segment arcuate ends 18 can be made at the diametral plane with provisions to recess the restraining strips 26 or their equivalent.

Threaded holes 41, 42 are machined in each segment arcuate end 18 into the wall of the segment 12, 13. The locations of the holes 41, 42 match up between the segments 12, 13 when the segments are assembled and aligned on the pipeline 11. Preferably, the threaded holes 42 in one segment 13 are blind while the threaded holes 41 in the other segment 12 are in the nature of counter bores having concentric reduced diameter holes 43 opening to the exterior of the segment wall. The threads of the holes 41, 42 are of the same diameter and pitch and are cut so that when the segments 12, 13 are properly aligned with each other, such that the locating pads 37 of the opposed segments are in abutting relation, the thread form (crest and root) of the opposed segments are in phase so that the helix of the thread of one hole 41 is coincident with the helix of the thread of the other opposed hole 42.

In their final assembly, the segments 12, 13 are joined together and bridged by headless bolts 44 received in the aligned holes 41, 42 of the opposed segments. Ideally, the threaded holes 41 are arranged with sufficient length to initially carry the bolts 44 fully or nearly fully retracted within the wall of the respective segment 12. For sake of simplicity, the holes 41 originally receiving the full length of the bolts 44 can all be located in one segment and these holes can be the ones associated with the reduced diameter holes 43. It will be understood that rearrangements of parts and geometries of the holes 41, 42 and 43 and bolts 44 is possible.

The fitting 10 is installed by assembling both segments 12, 13 around a damaged area of a pipeline 11. Various expedients including fixtures and/or mechanisms can be devised to align the respective segments to one another. One expedient are alignment pins on one or both arcuate end faces 27 of the segments and suitably placed receiving holes on opposing faces. The segments 12, 13 are provisionally held together with a suitable clamping arrangement so that the precision located reference surfaces on the locating pads 37 are in contact when the bolts 44 are extended from the holes 41 in which they are originally received into opposing holes of the other segment. Typical clamping arrangements may include straps, cables, chain, or the like wrapped around the segments 12 and 13. Another expedient is to provide at least two of the bolts 44, one on each side of the pipeline 11 with central bores to receive threaded draw bolts assembled through the reduced diameter holes 43 and threaded into minor tapped holes in the segment 13 at the base of respective blind holes 42. The draw bolts can be used to temporarily hold the segments 12, 13 together until a number of the main bolts 44 are extended into the segment 13.

The temporary clamping force holding the segments 12, 13 together should be enough to bring opposing longitudinal seals 23 into mutual contact. The interior of the fitting 10 can be temporarily vented through a port (not shown) in the wall of one of the segments 12, 13.

With the segments 12, 13 provisionally clamped together, the bolts 44 are turned to extend them into the opposed segment 13. This is accomplished by positioning a tool through the reduced diameter hole 43 associated with the bolt 44. The bolt 44 can have an accircular socket 46 such as a hex-shaped blind hole in the end facing the hole 43, and the tool can have a complementary shape to fit into the socket to drive the same.

When all of the bolts 44 have been extended, the circumferential seals 24 can be compressed with the thrust ring segments 28 by turning the thrust screws 33 into their respective holes so that they drive the thrust ring segments axially. Axial compression of the circumferential seals 24 causes them to seal tightly on the outside surface of the pipeline 11. Any vent can be closed at this time and, if needed or desired, a viscous settable sealant can be pumped into the fitting through a vent hole to augment the function of the seals 23, 24. It will be understood that a clearance space or annulus exists typically between the pipe outside surface and the inside surface of the fitting and this space can receive and distribute the settable sealant. The bolts 44 sustain the hoop forces in the fitting 10 created by the pressure of any fluid leaking from the pipe 11. The provisions for temporarily clamping the segments 12, 13 together may be removed once the bolts 44 are deployed.

After the circumferential seals 24 have been deployed (existing at each end) and any sealant has been injected into the annulus between the interior of the fitting 10 and exterior of the pipeline, the fitting can be seal welded. This will include welding the axial ends 20 to the circumference of the pipeline 11 and the outer edges of the opposed arcuate end surfaces 34 together. The reduced diameter holes 43 are also seal welded. The seal welding steps are substantially less involved and less difficult than what has been necessary to seal weld a traditional split sleeve fitting at longitudinally extending sidebars or flanges including the nuts and bolt heads projecting from them. The sidebar-free construction afforded by the invention can be applied to other pipe repair fittings such as split flange repair rings and split hot tapping saddles, for example.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited. For example, the threaded holes 41 or their equivalents can extend through the wall of the segment 12 thereby eliminating the reduced diameter holes 43.

What is claimed is:

1. A pipe repair fitting comprising a pair of generally semi-circular segments having walls concentric about an axis, the segment walls having generally cylindrical inside and outside surfaces, axial end surfaces and arcuate end surfaces, the segments being essentially devoid of radial flanges adjacent arcuate ends of the segments, compressible seals adjacent the inside wall surfaces of both segments adapted to engage and at least partially seal against the outside surface of a pipe or pipe fitting, the segments being assemblable around the circumference of a pipe or pipe fitting by positioning them with the arcuate ends of one segment facing the arcuate ends of the other segment with all of the arcuate ends in or adjacent a common diametral plane and the axes of the segments being substantially coincident with the axis of the pipeline or pipe fitting, at least one threaded bolt extending between the segments at and within the boundary of each pair of mutually facing arcuate ends, each pair of mutually facing arcuate ends having aligned holes to receive the respective bolts, the aligned holes being internally threaded, each of the segments at each pair of mutually facing arcuate ends having internally threaded holes with their threads aligned with a common helix when the segments are in assembled relation to one another.

2. A pipe repair fitting as set forth in claim 1, wherein a threaded hole of at least one segment arcuate end at each pair of mutually facing segment arcuate ends is blind.

3. A pipe repair fitting comprising a pair of generally semi-circular segments having walls concentric about an axis, the segment walls having generally cylindrical inside and outside surfaces, axial end surfaces and arcuate end surfaces, compressible seals adjacent the inside wall surfaces adapted to engage and at least partially seal against the outside surface of a pipe or pipe fitting, the segments being assemblable around the circumference of a pipe or pipe fitting by positioning them with the arcuate ends of one segment facing the arcuate ends of the other segment with all of the arcuate ends in or adjacent a common diametral plane and the axes of the segments being substantially coincident with the axis of the pipeline or pipe fitting, at least one threaded bolt extending between the segments at each pair of mutually facing arcuate ends, each pair of mutually facing arcuate ends having aligned holes to receive the respective bolts, the holes being internally threaded, each of the segments at each pair of mutually facing arcuate ends having internally threaded holes with their threads aligned with a common helix when the segments are in assembled relation to one another, a threaded hole of at least one segment arcuate end at each pair of mutually facing segment arcuate ends being blind, a threaded hole of the segment arcuate end opposite the segment arcuate end having the blind threaded hole having a reduced diameter tool access hole opening through the segment outer surface to permit the respective threaded bolt to be rotated into engagement with an opposed one of the segments.

4. A pipe repair fitting comprising a mating pair of generally semi-circular segments, each formed by an arcuate wall having arcuate ends, the segment walls carrying compressible seals for sealing two pairs of mating arcuate ends of the segments and sealing on the outer periphery of the pipe, at least one threaded hole in each arcuate wall end, a common bolt in threaded engagement with each of the threaded holes of each pair of mating arcuate ends and serving in tension to sustain hoop forces in the fitting imposed by fluid leaking out of the pipe and contained by said seals, the segments being devoid of radial flanges adjacent their arcuate ends serving to sustain forces in said bolts.

5. A pipe repair fitting comprising a mating pair of generally semi-circular segments, each formed by an arcuate wall having arcuate ends, the arcuate ends of one segment mating with respective ends of the other segment, at least one threaded hole in a pair of opposing arcuate wall ends, a common bolt in threaded engagement with each of the threaded holes of the pair of mating arcuate ends and serving in tension to sustain hoop forces in the fitting imposed by fluid carried in the pipe, the segments being devoid of radial flanges adjacent their arcuate ends serving to sustain forces in said bolts.

* * * * *